(12) United States Patent
Hanamori

(10) Patent No.: US 7,013,404 B2
(45) Date of Patent: Mar. 14, 2006

(54) SEMICONDUCTOR INTEGRATED CIRCUIT CHARACTERIZED BY TIMING ADJUSTMENT OF CLOCK SWITCHING CONTROL

(75) Inventor: Hiroyuki Hanamori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 564 days.

(21) Appl. No.: 10/259,756

(22) Filed: Sep. 30, 2002

(65) Prior Publication Data

US 2003/0090302 A1    May 15, 2003

(30) Foreign Application Priority Data

Nov. 12, 2001 (JP) ............................. 2001-346505

(51) Int. Cl.
  *G06F 1/08*   (2006.01)
  *G06F 1/12*   (2006.01)

(52) U.S. Cl. ..................... 713/500; 713/400
(58) Field of Classification Search ............... 713/500, 713/400
See application file for complete search history.

(56) References Cited

U.S. PATENT DOCUMENTS

| | | | | |
|---|---|---|---|---|
| 4,095,267 A | * | 6/1978 | Morimoto | 713/501 |
| 5,274,678 A | * | 12/1993 | Ferolito et al. | 375/357 |
| 5,315,181 A | * | 5/1994 | Schowe | 326/93 |
| 5,389,826 A | * | 2/1995 | Sonobe | 307/125 |
| 5,481,697 A | * | 1/1996 | Mathews et al. | 713/501 |
| 5,528,307 A | * | 6/1996 | Owada et al. | 348/497 |
| 5,675,615 A | * | 10/1997 | Watt | 375/354 |
| 5,790,609 A | * | 8/1998 | Swoboda | 375/357 |
| 6,026,498 A | * | 2/2000 | Fuse et al. | 713/600 |
| 6,194,940 B1 | * | 2/2001 | Hunter et al. | 327/298 |
| 6,255,882 B1 | * | 7/2001 | Hirai | 327/291 |
| 6,452,426 B1 | * | 9/2002 | Tamarapalli et al. | 327/99 |
| 6,466,073 B1 | * | 10/2002 | Yukinari et al. | 327/291 |

\* cited by examiner

*Primary Examiner*—Thomas Lee
*Assistant Examiner*—Ji H. Bae
(74) *Attorney, Agent, or Firm*—Rabin & Berdo, P.C.

(57) ABSTRACT

The semiconductor integrated circuit capable of reducing the length of time required for clock switching is provided. The semiconductor integrated circuit includes a clock generation control circuit which is provided with a register capable of writing and reading specific data, and generates a frequency divided clock by inputting a reference clock with the timing of a clock frequency division setting signal. A clock control circuit constituting this semiconductor integrated circuit comprises a status shift circuit that controls clock frequency division/switching, a switching timing generation circuit that measures the timing with which a clock switch is made and a selection switching circuit that makes a switch between the reference clock and the frequency divided clock.

15 Claims, 16 Drawing Sheets

HALF FREQUENCY TRANSITION AT STATUS DETERMINING CIRCUIT

SEMICONDUCTOR INTEGRATED CIRCUIT CHARACTERIZED BY TIMING ADJUSTMENT OF CLOCK SWITCHING CONTROL

BACKGROUND OF THE INVENTION

The present invention relates to a semiconductor integrated circuit and more specifically, it relates to a clock frequency division control circuit that selects/switches to a specific frequency divided clock among a plurality of frequency divided clocks.

DESCRIPTION OF THE RELATED ART

FIG. 1 presents an example of a structure adopted in a semiconductor integrated circuit and the related art. FIG. 1 is a block diagram of the semiconductor integrated circuit in the related art.

As FIG. 1 illustrates, a semiconductor integrated circuit 1001 comprises a microcontroller 1006 and a clock control circuit 1002.

The microcontroller 1006 is constituted of a CPU (central processing unit) 1010, a clock generation control circuit 1008 that engages in clock control and an I/O 1012 which is a peripheral device having a timer circuit and the like. An internal bus (BUS) 1014 connects the CPU 1010, the I/O 1012 and the clock generation control circuit 1008 with one another.

The microcontroller 1006 performs high-speed calculation and the like, executed in an application based upon a control basic clock BCLK transmitted from a frequency divided clock control circuit 1004.

The clock generation control circuit 1008 includes a register 1007, and the frequency divided clocks of a master clock MCLK, e.g., a full frequency clock, a ¼ frequency clock or a ⅛ frequency clock, is determined in conformance to the setting at the register 1007.

The clock control circuit 1002 is constituted of the frequency divided clock control circuit 1004 that controls selection/switching of the frequency divided clocks and the like. The clock control circuit 1002 outputs the control basic clock BCLK to be transmitted to the microcontroller by using the master clock MCLK provided from the outside of the semiconductor integrated circuit 1001.

In addition, the clock control circuit 1002 dynamically switches the clock frequency in conformance to the value set at the register 1007 provided within the microcontroller 1006.

Next, the frequency divided clock control circuit 1004 constituting the clock control circuit 1002 is explained in reference to FIG. 2. FIG. 2 is a block diagram of a frequency divided clock control circuit in the related art.

As shown in FIG. 2, the frequency divided clock control circuit 1004 is constituted of a frequency divider circuit 1236 that generates frequency divided clocks, a selector 1240 that selects a frequency divided clock and a flip-flop D8FF that performs a sampling operation by using a ⅛ frequency clock.

The frequency divider circuit 1236 generates various frequency divided clocks, i.e., a full frequency clock 1242, ½ frequency clock 1244, a ¼ frequency clock 1246 and a ⅛ frequency clock 1248 by using the master clock MCLK input thereto.

The flip-flop D8FF samples the setting of a clock frequency division setting signal DSEL transmitted from the clock generation control circuit 1008 by using the semiconductor integrated circuit ⅛ frequency clock generated by the frequency divider circuit 1236. The value indicating the sampling results is provided to the selector 1240.

In correspondence to the value indicating the sampling results obtained at the flip-flop D8FF, the selector 1240 switches to the full frequency clock 1242 if the sampled value indicates "0", switches to the semiconductor integrated circuit ½ frequency clock 1244 if the sampled value indicates "1", switches to the semiconductor integrated circuit ¼ frequency clock 1246 if the sampled value indicates "2" and switches to the semiconductor integrated circuit ⅛ frequency clock if the sampled value indicates "3" as shown in FIG. 2. The selected frequency divided clock among the frequency divided clocks generated at the frequency divider circuit 1236 is then output as the control basic clock BCLK.

However, there is a problem with the semiconductor integrated circuit 1001 in the related art in that since a selection is made from various frequency divided clocks such as a ⅛ frequency clock, a ¼ frequency clock and a ½ frequency clock, it can take a significant length of time, i.e., as long as the equivalent of 15 clocks, to select one There is another problem in that since a clock is selected from the four different frequency divided clocks as described above, there is a high risk of a hazard occurring during the switching processing.

While a high frequency is required for a computer when application software processing such as an arithmetic operation needs to be executed at high speed on the computer, it is desirable to keep the frequency as low as possible for purposes of saving energy if such a high frequency is not required. However, there is a problem in that the operating frequency cannot be switched from low to high quickly to enable an immediate processing operation.

SUMMARY OF THE INVENTION

Accordingly, an object of the present invention, which has been completed by addressing the problems of the semiconductor integrated circuit in the related art discussed above, is to provide a new and improved semiconductor integrated circuit capable of reducing the length of time required for clock switching.

Another object of the present invention is to provide a new and improved semiconductor integrated circuit capable of preventing a hazard from occurring during the clock switching processing.

In order to achieve the objects described above, the semiconductor integrated circuit according to the present invention comprises; a clock control circuits having a reference clock input thereto, which generates a control basic clock to be used to implement clock control on a central processing unit, and a microcontroller having the central processing unit and a clock generation control circuit that controls the generation of the control basic clock at the clock control circuit in conformance to an instruction issued by the central processing unit.

The clock control circuit in this semiconductor integrated circuit includes a status shift circuit that generates a frequency divided clock by shifting the status of a signal level in correspondence to a value indicated by a clock frequency division setting signal transmitted from the clock generation control circuit, a switching timing generation circuit that measures the timing with which a switch between the reference clock and the frequency divided clock is made and a selection switching circuit that generates the control basic clock by switching between the reference clock and the frequency divided clock.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

Figure 1:
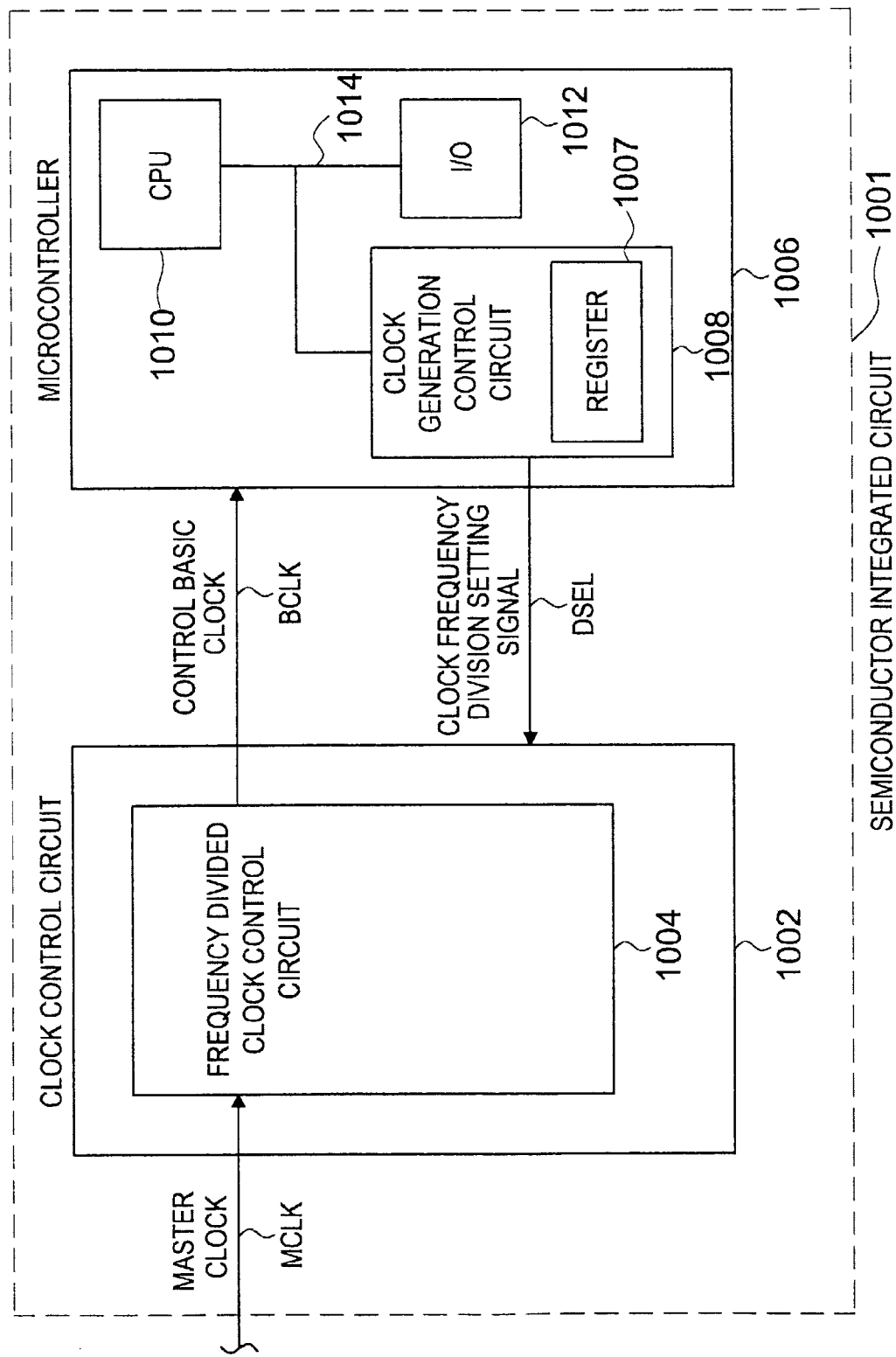
FIG. 1 presents a block diagram showing the structure adopted in a semiconductor integrated circuit in the related art.

The following is a detailed explanation of embodiments of the present invention, given in reference to the drawings. It is to be noted that the same reference numerals are assigned to components achieving substantially identical functions and structural features in the specification and the drawings to preclude the necessity for a repeated explanation thereof.

The features of the semiconductor integrated circuits achieved in the embodiments of the present invention are now explained.

In a clock control circuit constituting the semiconductor integrated circuit, while the timing with which a switch is made using a reference clock in conformance to the level of a signal set at a register is measured, a status shift circuit implements frequency divided clock control by shifting the clock signal level. Thus, a reduction in the length of time required for the switching processing at the semiconductor integrated circuit is achieved.

The status shift circuit constituting the semiconductor integrated circuit individually generates frequency divided clocks with varying cycles. As a result, the semiconductor integrated circuits is enabled to make a switch among the frequency divided clocks in a stable manner.

The status shift circuit constituting the semiconductor integrated circuit holds the signal level of a frequency divided clock in a steady state with the timing with which a switching valid signal is received. Since the state in which the signal is held at a constant level is sustained in this manner, a switch from a frequency divided clock to the reference clock can be made with a high degree of stability.

A switch is made at the semiconductor integrated circuit while the signal level of the frequency divided clock is at least held in a steady state. Consequently, the timing with which a switch is made between the frequency divided clock and the reference clock can be measured with ease.

The cycles of the frequency divided clocks that are generated are preselected. As a result, it is possible to select a frequency divided clock in correspondence to the conditions under which the semiconductor integrated circuit is to be operated. The reference clock is a clock input from the outside, which may be, for instance, a master clock.

(First Embodiment)

Figure 3:
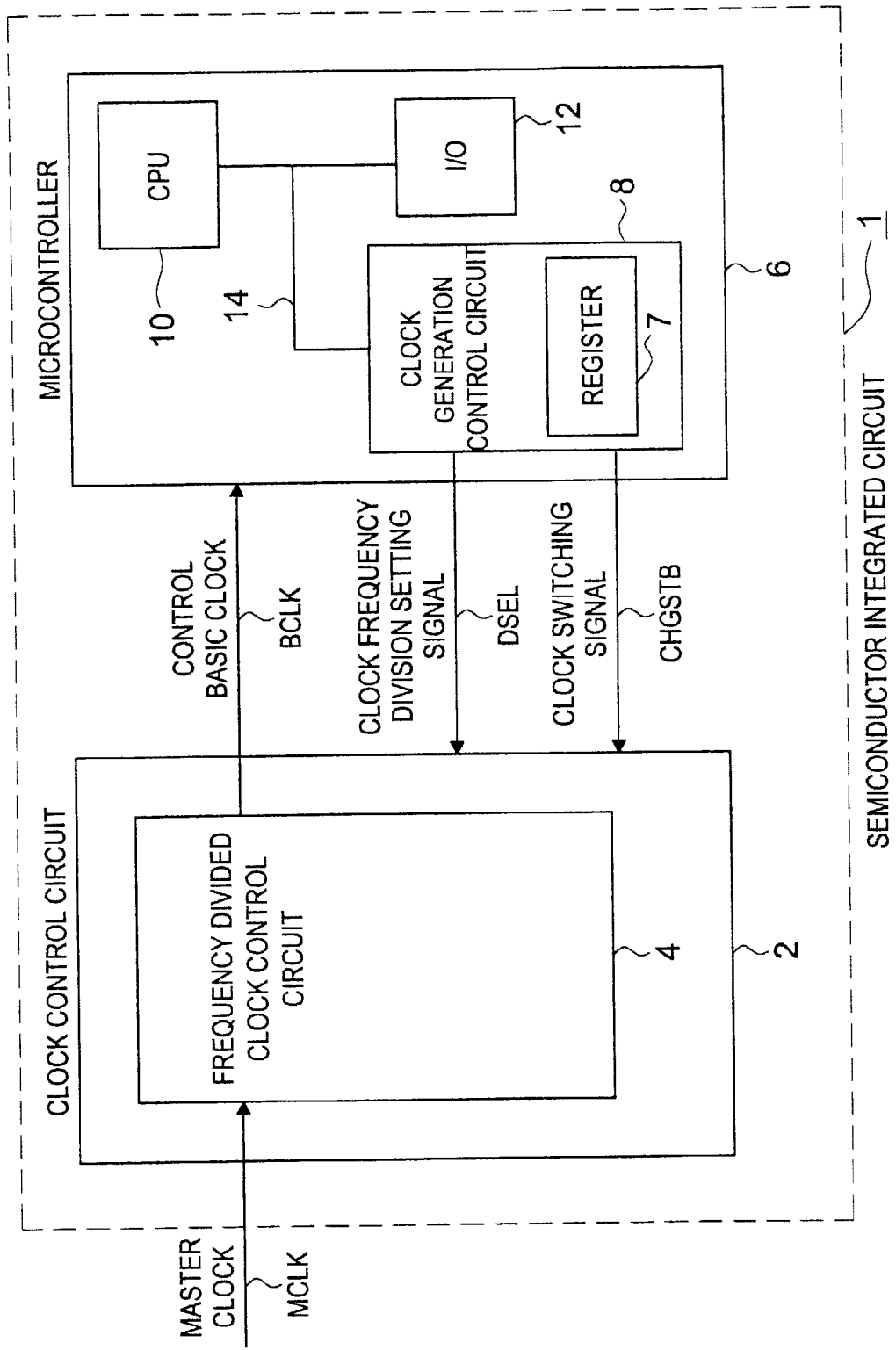
FIG. 3 presents a block diagram showing the structure adopted in a semiconductor integrated circuit in a first embodiment.

First, in reference to FIG. 3, the semiconductor integrated circuit achieved in the first embodiment is explained. FIG. 3 presents a block diagram showing the structure adopted in the semiconductor integrated circuit in the first embodiment.

As illustrated in FIG. 3, the semiconductor integrated circuit in the first embodiment comprises a microcontroller 6 and a clock control circuit 2. The microcontroller 6 executes task processing requested in an application or the like, in response to a control basic clock BCLK transmitted from the clock control circuit 2.

The microcontroller 6 includes a CPU (central processing unit) 10 that executes processing in response to an instruction and the like, a clock generation control circuit 8 that implements clock control and an I/O 12 which is a peripheral I/O having a timer circuit and the like. An internal bus (BUS) 14 connects the CPU 10, the I/O 12 and the clock generation control circuit 8 with one another.

The clock generation control circuit 8 is provided with a register 7. The value indicating a specific frequency divided clock that is set at the register 7 determines the frequency (divided frequency) of the frequency divided clock generated in reference to the master clock MCLK, which may be a full frequency clock, a ¼ frequency clock or a ⅛ frequency clock.

In addition, the clock generation control circuit 8 provides a clock switching signal CHGSTB constituted of a clock switching strobe (strobe signal) indicating that a write operation (setting) has been performed at the register 7 to the clock control circuit 2 during the cycle following the cycle in which the specific value was set at the register 7. The clock switching processing is triggered by the clock switching signal CHGSTB transmitted to the clock control circuit 2. It is to be noted that the switching processing is to be explained in detail later.

The clock control circuit 2 is constituted of a frequency divided clock control circuit or the like. The clock control circuit 2 includes a frequency divided clock control circuit 4 that controls the individual frequency divided clocks such as the full frequency clock, the semiconductor integrated circuit ½ frequency clock, the semiconductor integrated circuit ¼ frequency clock and the semiconductor integrated circuit ⅛ frequency clock generated by using the master clock MCLK input to the frequency divided clock control circuit 4.

Figure 4:
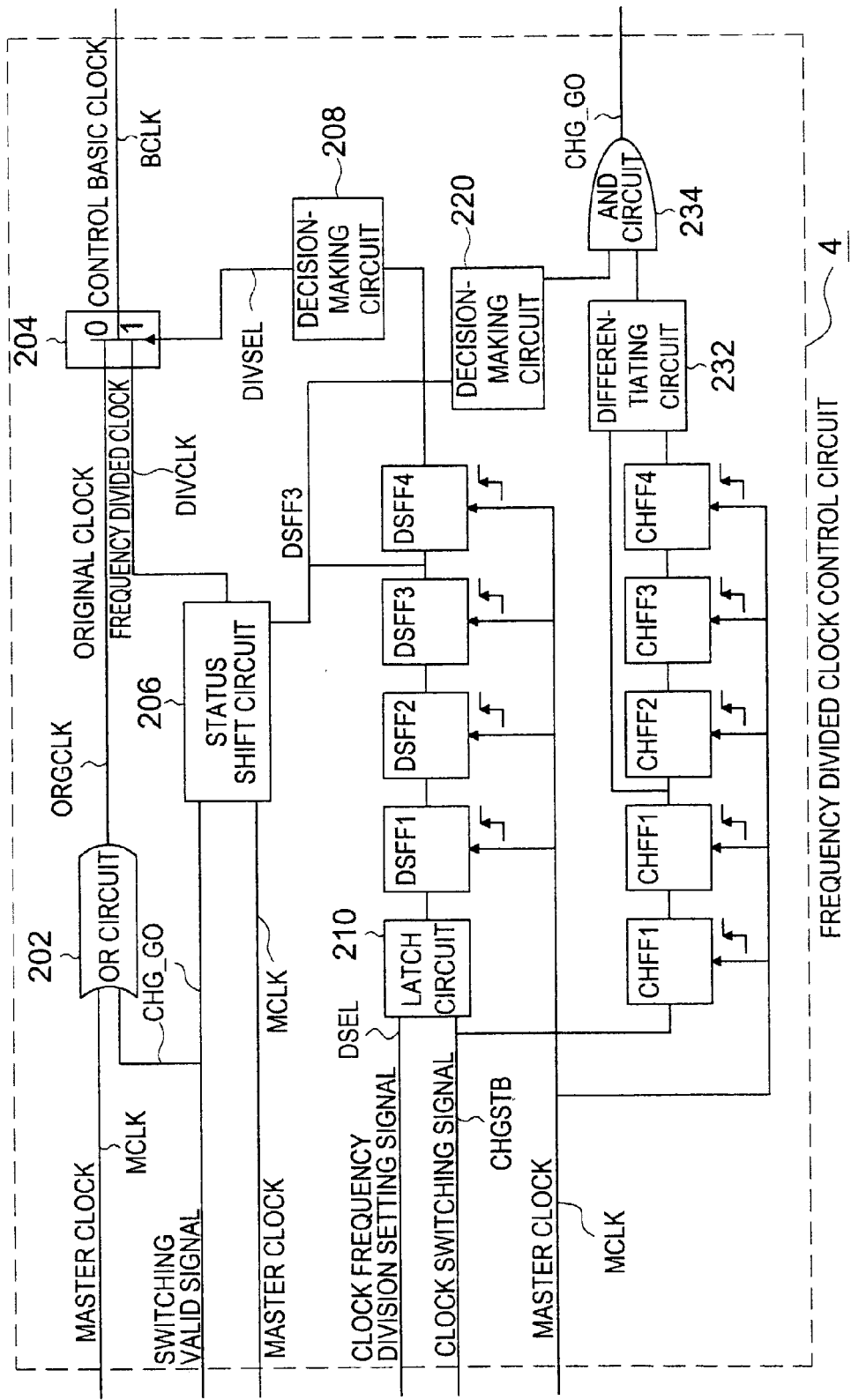
FIG. 4 presents a block diagram showing the structure adopted in the frequency divided clock control circuit in the first embodiment.

Next, in reference to FIG. 4, the frequency divided clock control circuit 4 achieved in the first embodiment is explained. FIG. 4 presents a block diagram showing the structure adopted in the frequency divided clock control circuit 4 in the first embodiment.

As shown in FIG. 4, the frequency divided clock control circuit 4 is constituted of a status shift circuit 206 that controls the clock frequency division or the clock switching, a switching, a switching timing generation circuit that includes a latch circuit, flip-flops or the like and generates clock switching timing, a selection switching circuit that engages in clock switching processing by judging the clock switching timing and an OR circuit 202 to which the master clock MCLK and a switching valid signal CHG_GO are input.

Figure 5:
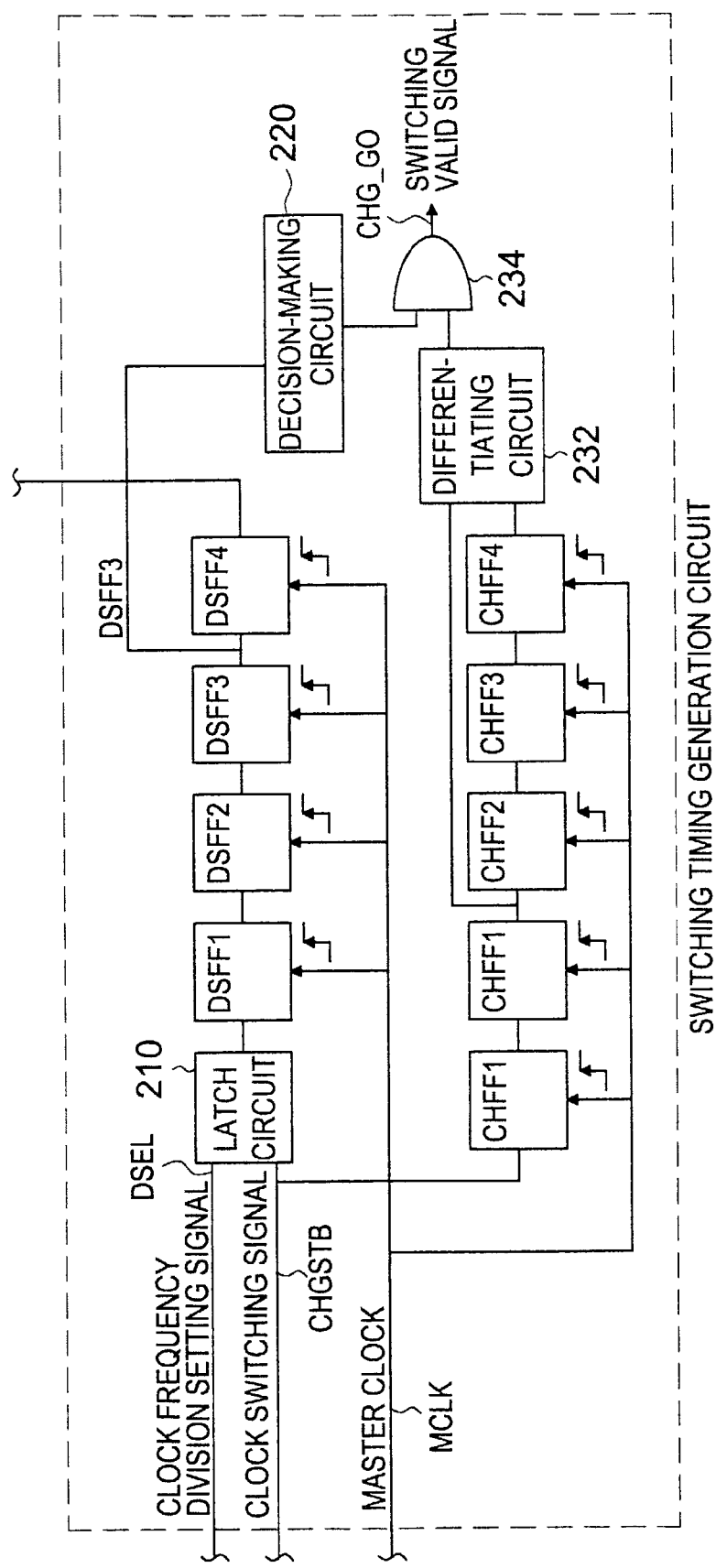
FIG. 5 shows part of the block diagram of the frequency divided clock control circuit, illustrating the structure adopted in the switching timing generation circuit in the first embodiment.

Next, the switching timing generation circuit achieved in the first embodiment is explained in reference to FIG. 5. FIG. 5 shows the part of the block diagram of the frequency divided clock control circuit 4 corresponding to the switching timing generation circuit achieved in the first embodiment.

As shown in FIG. 5, the switching timing generation circuit comprises a latch circuit (LT circuit) 210 that samples the clock frequency division setting made in conformance to a clock frequency division setting signal DSEL and the clock switching signal CHGSTB, a setting signal flip-flop DSFF1, a setting signal flip-flop DSFF2, a setting signal flip-flop DSFF3 and a setting signal DSFF4 that sample the clock frequency division setting signal DSEL, a switching signaled flip-flop CHFF1, a switching signal flip-flop CHFF2, a switching signal flip-flop CHFF3 and a switching signal flip-flop CHFF4 each constituted of a circuit that samples the clock switching signal CHGSTB which is a clock switching strobe (strobe signal), a differentiating circuit 232 that generates a pulse at the status shift circuit 206 by differentiating the values sampled at the switching signal flip-flop CHFF1~CHFF4, a decision-making circuit 220 and an AND circuit 234 that outputs the switching valid signal CHG_GO if a clock other than the full frequency clock is selected.

The decision-making circuit 220 makes a decision that neither the output value from the differentiating circuit 232 obtained by differentiating sample values of the clock switching signal nor the value obtained at the setting signal flip-flop DSFF3 is a binary value "0" (2'b00). It is to be noted that "2'b00" indicates a binary value 00 in this specification.

Figure 6:
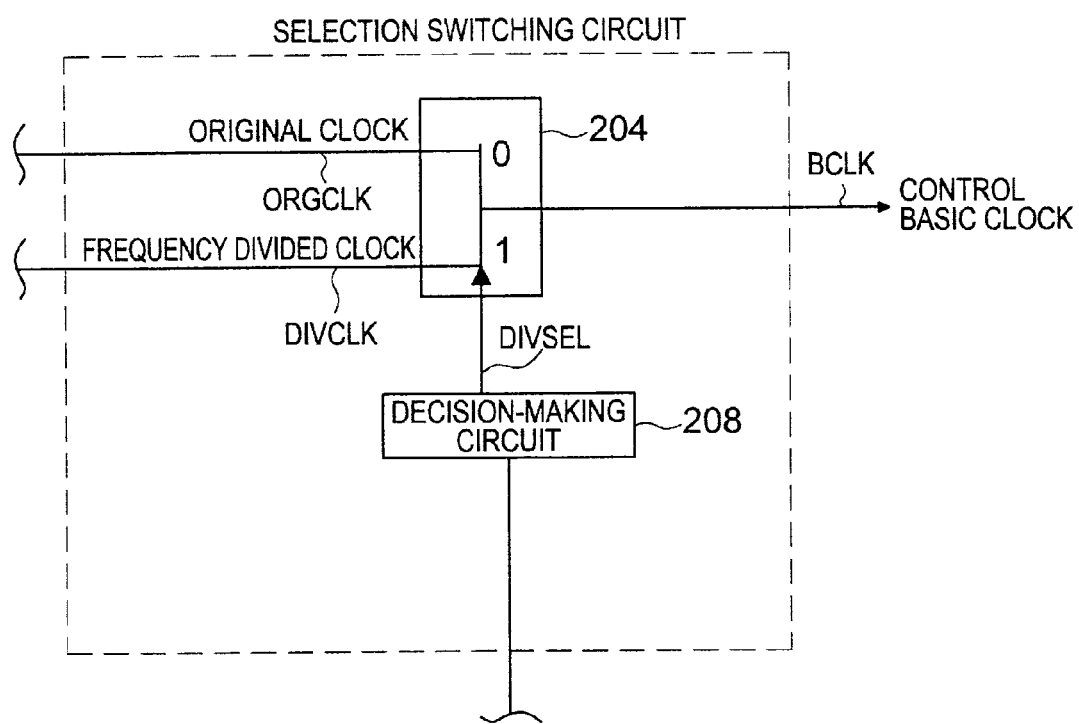
FIG. 6 shows part of the block diagram of the frequency divided clock control circuit, illustrating the structure adopted in the selection switching circuit in the first embodiment.

Now, the selection switching circuit achieved in the first embodiment is explained in reference to FIG. 6. FIG. 6 shows the part of the block diagram of the frequency divided clock control circuit 4 that corresponds to the selection switching circuit achieved in the first embodiment.

As shown in FIG. 6, the selection switching circuit is constituted of a decision-making circuit 208 and a selector 204 that selects either an original clock ORGCLK or a frequency divided clock DIVCLK and outputs the control basic clock BCLK.

The decision-making circuit 208 makes a decision that the value obtained by decoding the output from the setting signal flip-flop DSFF4 is not a binary value "0" (2'b00).

The selector 204 selects the frequency divided clock DIVCLK and outputs the frequency divided clock DIVCLK as the control basic clock BCLK if a clock other than the full frequency clock has been set. If, on the other hand, the full frequency clock has been set, the selector 204 selects the original clock ORGCLK and outputs the original clock ORGCLK as the control basic clock BCLK. The original clock ORGCLK is a clock output from the OR circuit 202 having the master clock MCLK and the switching valid signal CHG_GO input thereto.

Figure 7:
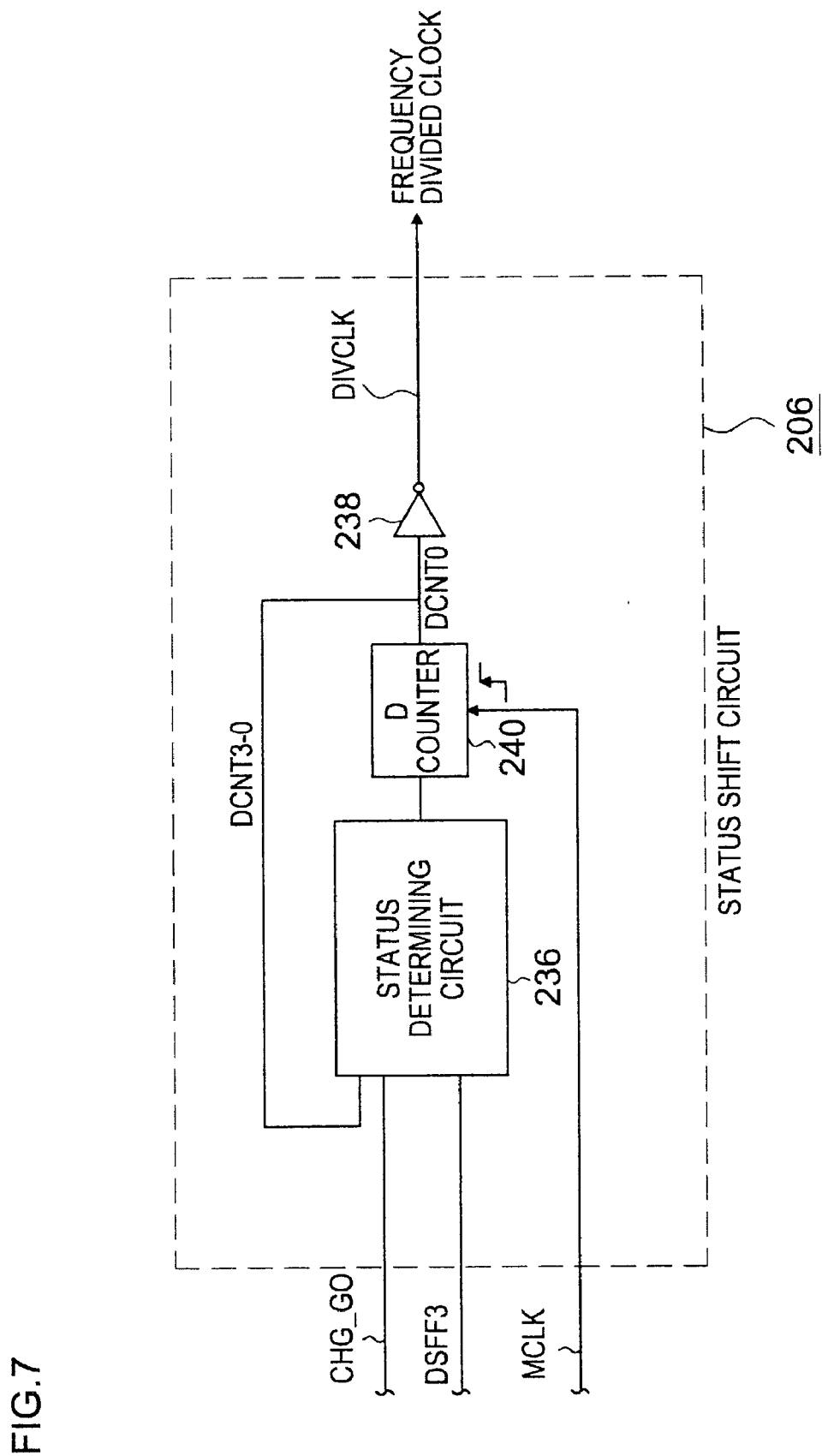
FIG. 7 shows part of the block diagram of the frequency divided clock control circuit, illustrating the structure adopted in the status shift circuit in the first embodiment.

Next, in reference to FIG. 7, the status shift circuit 206 achieved in the first embodiment is explained. FIG. 7 shows the part of the block diagram of the frequency divided clock control circuit 4 that corresponds to the status shift circuit 206 achieved in the first embodiment.

As shown in FIG. 7, the status shift circuit 206 is constituted of a D counter 240 which is a 4-bit counter capable of holding the current clock output state, a status-determining circuit 236 that determines the next signal level status of the clock selected as the frequency divided clock based upon the switching valid signal CHG_GO and the value sampled at the setting signal flip-flop DSFF3 and an invertor 238. "0" indicates the low signal level, whereas "1" indicates the high signal level. By repeatedly shifting between the low-level status and the high-level status, a clock is generated.

The value of DCNT0 corresponding to the value at bit 0 and constituting the value counted at the D counter 240 is allowed to be transmitted through the invertor 238 to be output as the frequency divided clock DIVCLK. In this specification, bit 0 indicates the lowest-order bit among n bits constituting data with a bit length of n, in which the order rises sequentially, i.e., from bit 0 to bit 1, from bit 1 to bit 2, from bit 2 to bit 3 . . . For instance, "0111" indicates "1" set for bit 0, "1" set for bit 1, "1" set for bit 2 and "0" set for bit 3.

Figure 8:
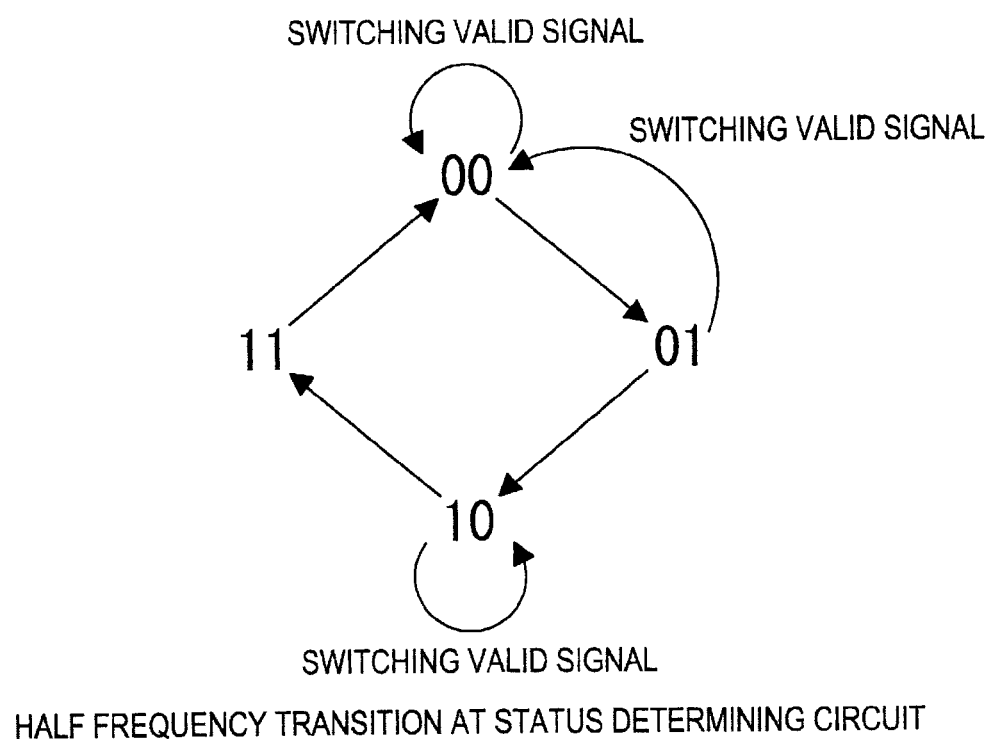
FIG. 8 presents a transition diagram showing the transition occurring in clock switching at the status determining circuit after the semiconductor integrated circuit ½ frequency clock is set.

An explanation is now given on an instance in which the control basic clock BCLK shifts to the full frequency clock while frequency divided clock DIVCLK is set to the semiconductor integrated circuit ½ frequency, in reference to FIGS. 4, 7 and 8. FIG. 8 presents a transition diagram showing the transition occurring in the clock switching at the status-determining circuit 236 when the semiconductor integrated circuit ½ frequency clock has been set.

As shown in FIG. 8, when the semiconductor integrated circuit ½ frequency clock has been set, the status-determining circuit 236 implements control by using two bits at the D counter 240 constituted of a 4-bit counter so as to determine the subsequent clock status of the semiconductor integrated circuit ½ frequency clock.

The clock status that shifts constantly as the next clock status is determined may undergo a change such as 00->01->10->11->00 . . . , as shown in FIG. 8. Bit 0 of these two bits represents the frequency divided clock DIVCLK.

In addition, if the switching valid signal CHG_GO becomes valid and the switching valid signal CHG_GO is input from the AND circuit 234 to the status-determining circuit 236 while the current status is, for instance, 00, no subsequent status shift occurs. The 00 status is maintained instead of shifting to 01 and is sustained continuously, as long as the switching valid signal CHG_GO remains valid.

In other words, when the switching valid signal CHG_GO is validated and input to the status-determining circuit 236, the status is set to, for instance, 11->00->00 . . . at the D counter 240 and the 00 status is sustained until the switching valid signal CHG_GO becomes invalid and is no longer input to the status-determining circuit 236.

As a result, while the switching valid signal CHG_GO is valid, the value of DCNT0 corresponding to bit 0 constituting the value counted at the D counter 240 remains "0" at all times, and thus, the frequency divided clock DIVCLK sustains the "1" status indicating the value obtained by inverting the value of DCNT0, as shown in FIG. 7.

In addition, as long as the switching valid signal CHG_GO is valid and the frequency divided clock DIVCLK sustains the "1" status, the status of the original clock ORGCLK output by the OR circuit 202 simultaneously is also fixed at "1".

When the switching valid signal CHG_GO becomes invalidated, the timing with which the switch is to be made from the frequency divided clock will have been determined to be valid by the decision-making circuit 208, and thus, the control basic clock BCLK is switched from the frequency divided clock DIVCLK to the original clock ORGCLK by the selector 204.

Figure 9:
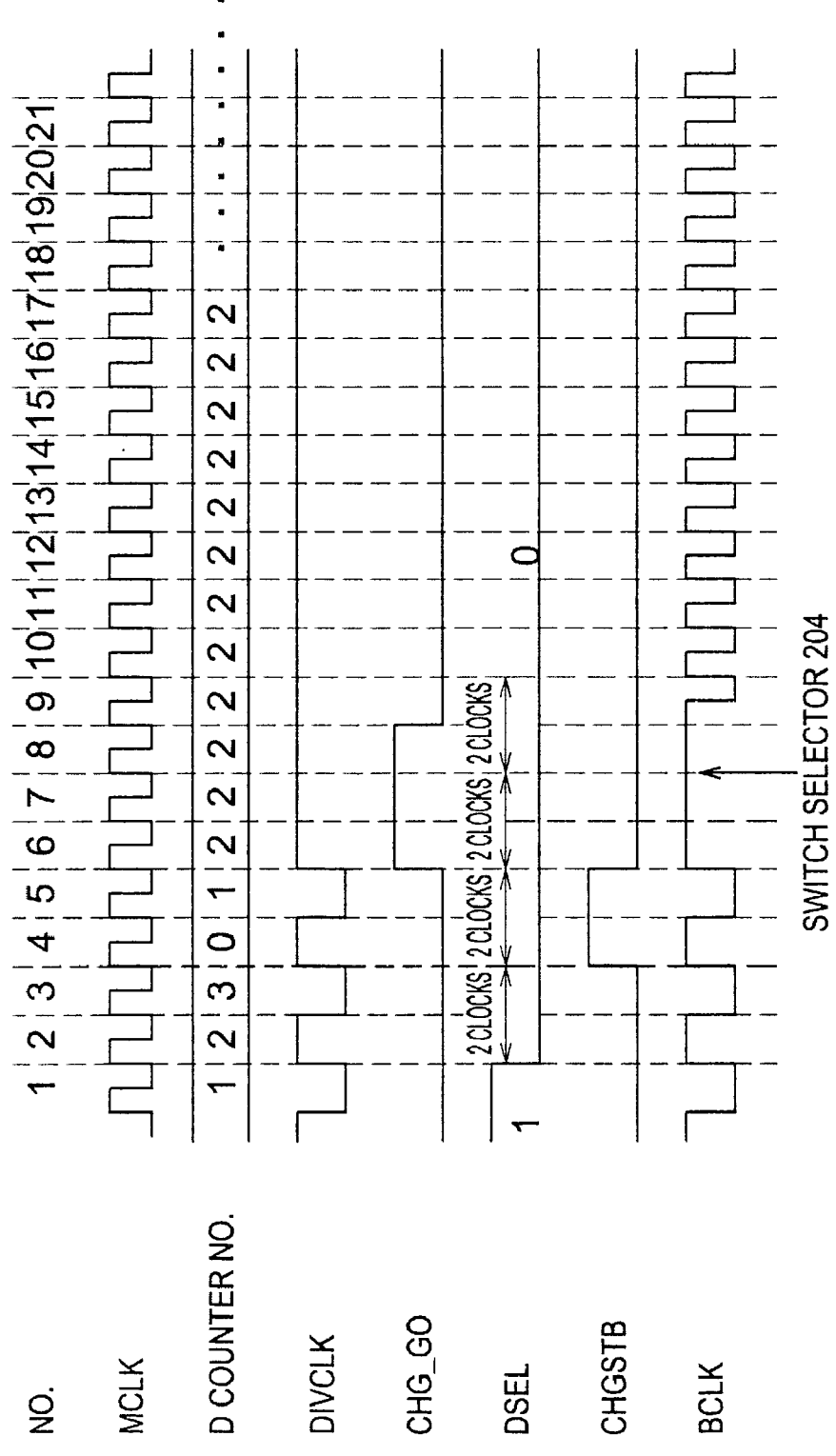
FIG. 9 presents a timing chart of the operation in which a switch is made from the semiconductor integrated circuit ½ frequency clock to the full frequency clock.

Next, the timing with which the control basic clock BCLK is switched from the semiconductor integrated circuit ½ frequency clock to the full frequency clock is explained in reference to FIG. 9. FIG. 9 is a timing chart of the operation during which a switch is made from the semiconductor integrated circuit ½ frequency clock to the full frequency clock.

The status shift of the frequency divided clock DIVCLK is counted at the D counter 240 by using two bits among the binary four bits. The D counter number of a counted value is indicated as a hexadecimal number.

As shown in FIG. 9, the D counter number of the frequency divided clock DIVCLK is expressed as, for instance; 1 (2'b01)->2 (2'b10)->3 (2'b11)->0 (2'b00)->1 (2'b01)->2 (2'b10). . . .

The semiconductor integrated circuit ½ frequency clock is generated as the frequency divided clock DIVCLK at the status-determining circuit 236 until immediately before the D counter number shifts to "2" (No. 6). A clock is generated as a result of a shift in the clock signal level, as shown in FIG. 8. As for the control basic clock BCLK, too, the semiconductor integrated circuit ½ frequency clock is output in a similar manner until immediately before the D counter number shifts to "2" (No. 6).

In addition, when the clock frequency division setting signal is set from "1" to "0" (from the semiconductor integrated circuit ½ frequency clock to the full frequency clock) as shown in FIG. 9, the clock switching signal CHGSTB is transmitted from the clock generation control circuit 6 to the frequency divided clock control circuit 4, as shown in FIG. 3, with the timing of the next cycle.

As the clock switching signal is transmitted to the frequency divided clock control circuit 4, the switching valid signal CHG_GO becomes valid at the D counter number 2 (No. 6) as shown in FIG. 9. The switching valid signal CHG_GO that has been validated is transmitted from the AND circuit 234 and is provided to the status shift circuit 206 and the OR circuit 202.

As explained earlier, when the switching of valid signal CHG_GO is input to the status shift circuit 206, the value of DCNT0 corresponding to bit 0 constituting the value counted at the D counter 240 remains at "0" at all times as long as the switching valid signal CHG_GO is valid. Thus, the frequency divided clock DIVCLK sustains the "1" status (the high-level state) indicating the value obtained by inverting the value of DCNT0 at all times.

Furthermore, as long as the switching valid signal CHG_GO is valid and the frequency divided clock DIVCLK sustains the "1" status, the status of the original clock ORGCLK output from the OR circuit 202 simultaneously, too, is fixed at "1" (the high-level state).

The subsequent D counter number following No. 6 at which the switching valid signal CHG_GO becomes valid is fixed at "2" as shown in FIG. 9. Thus, after the shift from the 01 (D counter number: 1) status to the 10 (D counter number:2) status, no further status shift occurs as long as the switching valid signal CHG_GO remains valid, as shown in FIG. 8.

As shown in FIG. 9, since the subsequent D counter number is fixed at 2 (2'b10) following No. 6, the value of DCNT0 corresponding to bit 0 constituting the value counted at the D counter 240 is sustained at "0". Namely, the frequency divided clock DIVCLK sustains the "1" status, i.e., the high-level state.

The original clock ORGCLK, too, sustains the "1" status, i.e., the high-level state. While these two clocks are in a stable state, as described above, the selector 204 switches from the frequency divided clock DIVCLK to the original clock ORGCLK as shown in FIG. 9. After the switch, the original clock ORGCLK is output as the control basic clock BCLK.

As shown in FIG. 9, the length of time required to switch from the frequency divided clock DIVCLK to the original clock ORGCLK in response to the setting change of the clock frequency division setting signal DSEL from "0" to "1" (from the semiconductor integrated circuit ½ frequency to the full frequency) is calculated to be: 2+2+2+2=8 . . . (1), through a conversion in which the master clock MCLK is used as a reference.

The value calculated in (1) above indicates that the length of time required for the switching processing is equivalent to 8 clocks.

Figure 10:
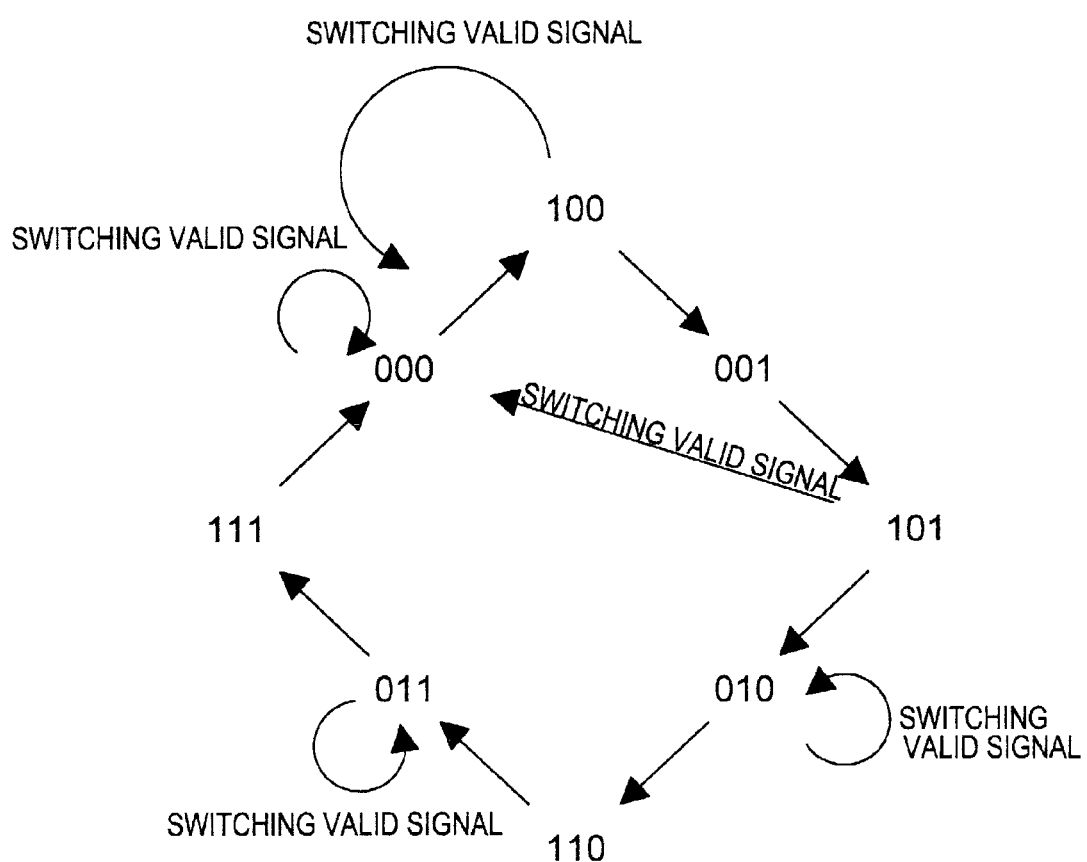
FIG. 10 presents a transition diagram showing the transition occurring in clock switching at the status determining circuit after the semiconductor integrated circuit ¼ frequency clock is set.

An explanation is now given on an instance in which the control basic clock BCLK shifts to the full frequency clock while frequency divided clock DIVCLK is set to the semiconductor integrated circuit ¼ frequency, in reference to FIGS. 4, 7 and 10. FIG. 10 presents a transition diagram showing the transition occurring in the clock switching at the status-determining circuit 236 when the semiconductor integrated circuit ¼ frequency clock has been set.

As shown in FIG. 10 when the semiconductor integrated circuit ¼ frequency clock has been set for the frequency divided clock DIVCLK, the status-determining circuit 236 implements control by using three bits at the D counter 240 having the 4-bit counter so as to determine the subsequent clock status of the semiconductor integrated circuit ¼ frequency clock.

The clock status that shifts constantly as the next clock status is determined may undergo a change such as 100->001->101->010->110->011 ..., as shown in FIG. 10. Bit 0 of these three bits represents the frequency divided clock DIVCLK constituted of the semiconductor integrated circuit ¼ frequency clock.

In addition, if the switching valid signal CHG_GO becomes valid and the switching valid signal CHG_GO is input from the AND circuit 234 to the status-determining circuit 236 while the current status is, for instance, 000, no subsequent status shift occurs. The 000 status is maintained at the clock instead of shifting to 100 and is continuously sustained as long as the switching valid signal CHG_GO remains valid.

In other words, when the switching valid signal CHG_GO is validated and transmitted to the status-determining circuit 236, the status is set to, for instance, 111->000->000... and the 000 status is sustained until the switching valid signal becomes valid.

As a result, while the switching valid signal CHG_GO is valid, the value of DCNT0 corresponding to bit 0 constituting the value counted at the D counter 240 remains "0" at all times, and thus, the frequency divided clock DIVCLK sustains the "1" status indicating the value obtained by inverting the value of DCNT0.

In addition, as long as the switching valid signal CHG_GO is valid and the frequency divided clock DIVCLK sustains the "1" status, the status of the original clock ORGCLK output by the OR circuit 202 simultaneously is also fixed at "1".

When the switching valid signal CHG_GO becomes invalidated, the timing with which the switch is to be made from the frequency divided clock will have been determined to be valid by the decision-making circuit 208 and, accordingly the selector 204 switches the clock cycle of the control basic clock BCLK from the frequency divided clock DIVCLK to the original clock ORGCLK.

Figure 11:
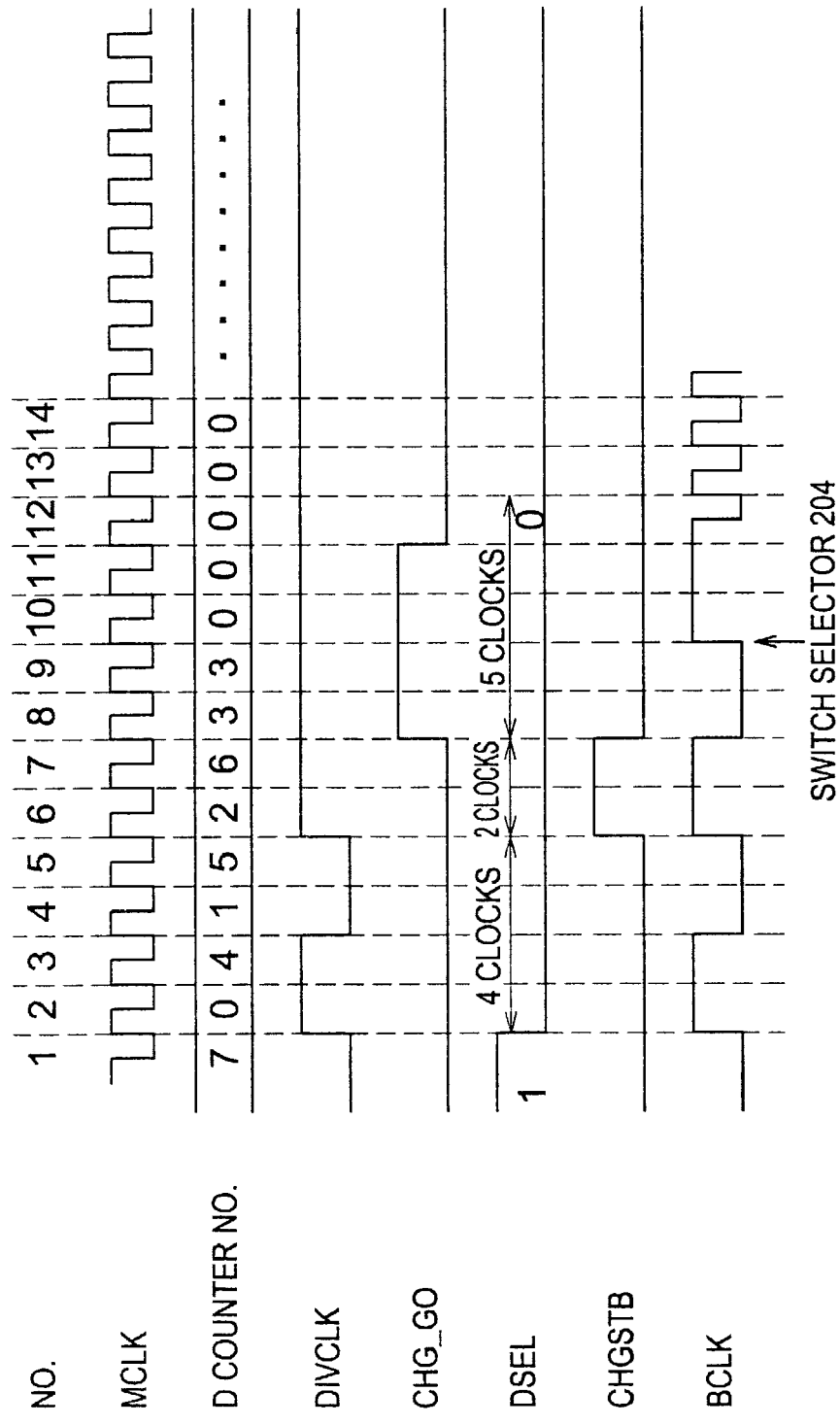
FIG. 11 presents a timing chart of the operation in which a switch is made from the semiconductor integrated circuit ¼ frequency clock to the full frequency clock.

Next, the timing with which the control basic clock BCLK is switched from the semiconductor integrated circuit ¼ frequency clock to the full frequency clock is explained in reference to FIG. 11. FIG. 11 is a timing chart of the operation during which a switch is made from the semiconductor integrated circuit ¼ frequency clock to the full frequency clock.

The status shift of the frequency divided clock DIVCLK is counted at the D counter 240 by using three bits among the binary four bits. The D counter number of a counted value is indicated as a hexadecimal number.

As shown in FIG. 11, the D counter number is expressed as, for instance; 7 (2'b111)->0 (2'b000)->4 (2'b100)->1 (2'b001)->5 (2'b101)->2 (2'b00)...

The semiconductor integrated circuit ¼ frequency clock is generated as the frequency divided clock DIVCLK at the status-determining circuit 236 until immediately before the D count number shifts to "3" (No. 8). A clock is generated as a result of the shift in the clock signal level, as shown in FIG. 10. As for the control basic clock BCLK, the semiconductor integrated circuit ¼ frequency clock is generated in a similar manner until immediately before the D counter number shifts to "3" (No. 8).

In addition, when the clock frequency division setting signal is set from "1" to "0" (from the semiconductor integrated circuit ¼ frequency clock to the full frequency clock) as shown in FIG. 11, the clock switching signal CHGSTB is transmitted from the clock generation control circuit 6 to the frequency divided clock control circuit 4, as shown in FIG. 3, with the timing of the next cycle.

Figure 13:
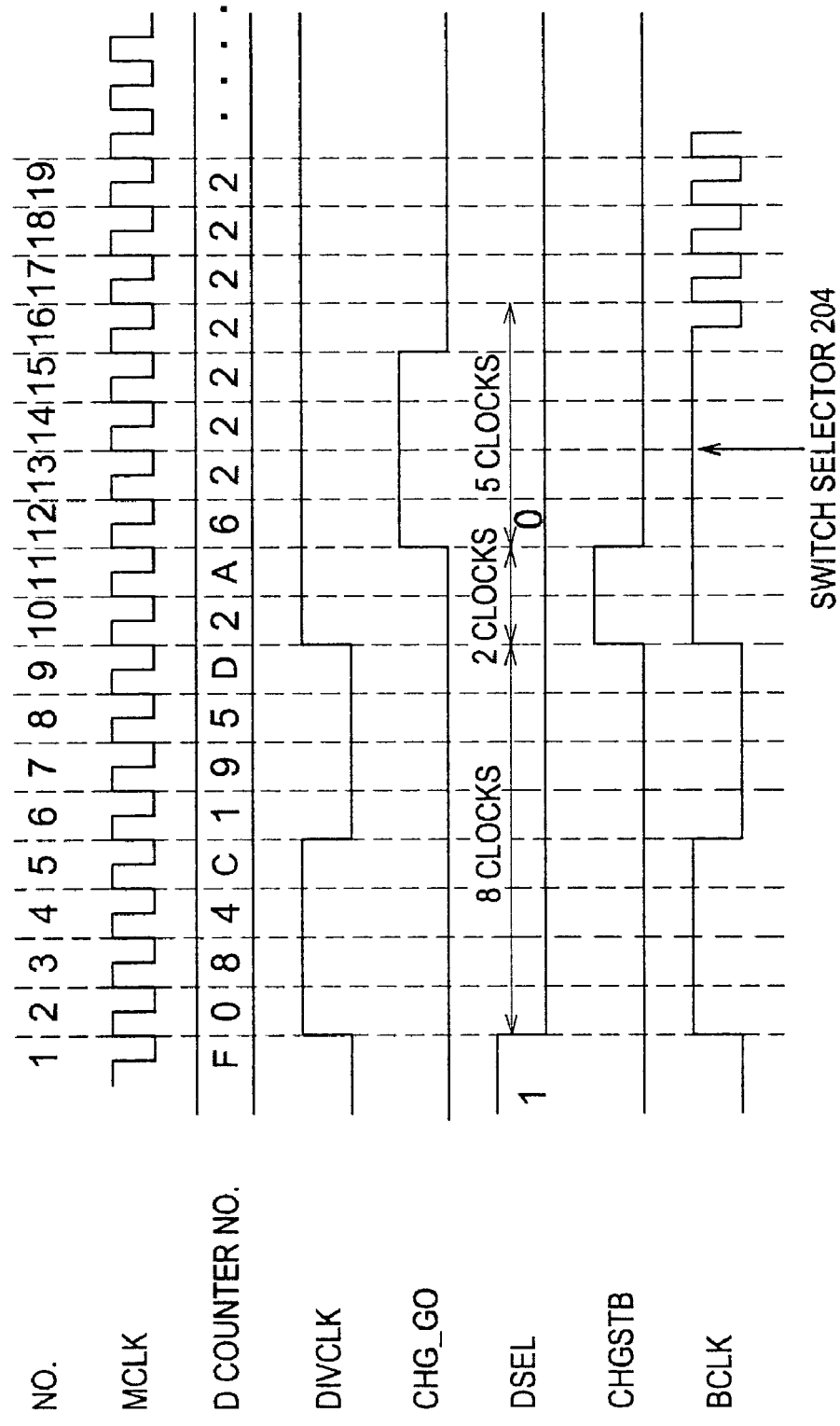
FIG. 13 presents a timing chart of the operation in which a switch is made from the semiconductor integrated circuit ⅛ frequency clock to the full frequency clock.

As the clock switching signal is transmitted to the frequency divided clock control circuit 4, the switching valid signal CHG_GO becomes valid at the D counter number "3" (No. 8) as shown in FIG. 13 and the switching valid signal CHG_GO is then transmitted from the AND circuit 234 to be provided to the status shift circuit 206 and the OR circuit 202.

As explained earlier, when the switching valid signal CHG_GO is transmitted to the status shift circuit 206, the value of DCNT0 corresponding to bit 0 constituting the value counted at the D counter 240 remains at "0" at all times as long as the switching valid signal CHG_GO is valid. Thus, the frequency divided clock DIVCLK sustains the "1" status (the high-level state) indicating the value obtained by inverting the value of DCNT0 at all times.

Furthermore, as long as the switching valid signal CHG_GO is valid and the frequency divided clock DIVCLK sustains the "1" status, the status of the original clock ORGCLK output from the OR circuit 202 simultaneously, too, is fixed at "1" (the high-level state).

The subsequent D counter number following No. 10 at which the switching valid signal CHG_GO becomes valid is fixed at "0" as shown in FIG. 11.

As shown in FIG. 11, since the subsequent D counter number is fixed at 0 (2'b000) following No. 10, the value of DCNT0 corresponding to bit 0 constituting the value counted at the D counter 240 is sustained at "0". Namely, the frequency divided clock DIVCLK sustains the "1" status, i.e., the high-level state.

The original clock ORGCLK, too, sustains the "1" status, i.e., the high-level state. While these two clocks are in a stable state, as described above, the selector 204 switches from the frequency divided clock DIVCLK to the original clock ORGCLK as shown in FIG. 11. After the switch, the original clock ORGCLK is output as the control basic clock BCLK.

As shown in FIG. 11, the length of time required to switch from the frequency divided clock DIVCLK to the original clock ORGCLK in response to the setting change of the clock frequency division setting signal DSEL from "0" to "1" (from the semiconductor integrated circuit ¼ frequency to the full frequency) is calculated to be: 4+2+5=11 ... (2), through a conversion in which the master clock MCLK is used as a reference.

The value calculated in (2) above indicates that the length of time required for charging processing is equivalent to 11 clocks.

Figure 12:
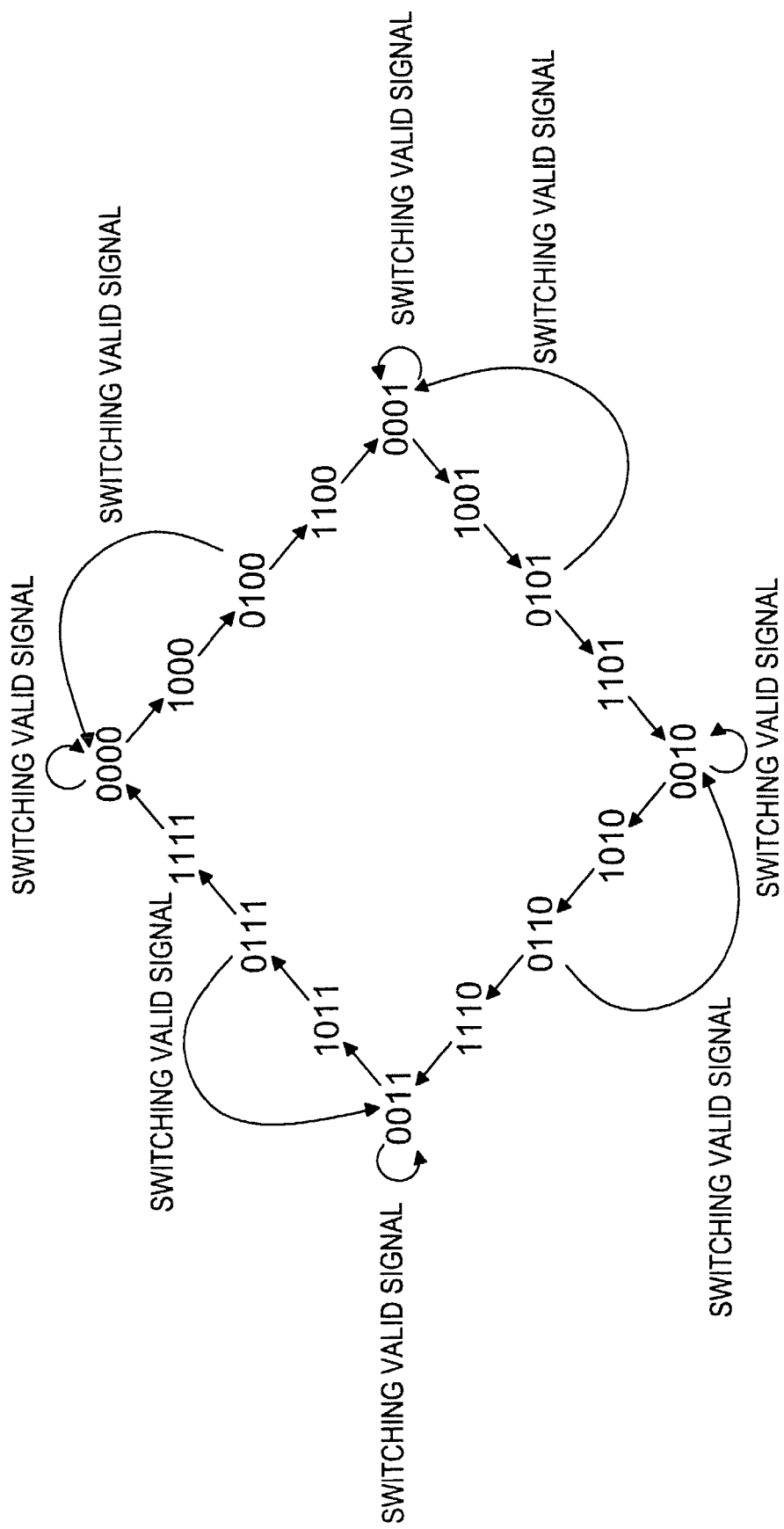
FIG. 12 presents a transition diagram showing the transition occurring in clock switching at the status determining circuit after the semiconductor integrated circuit ⅛ frequency clock is set.

An explanation is next given on an instance in which the clock setting shifts from the semiconductor integrated circuit ⅛ frequency to the full frequency in reference to FIGS. 4, 7 and 12. FIG. 12 presents a transition diagram showing the transition occurring in the clock switching at the status-determining circuit 236 when the semiconductor integrated circuit ⅛ frequency clock has been set.

As shown in FIG. 12, when the semiconductor integrated circuit ⅛ frequency clock has been set, the status-determining circuit 236 implements control by using the D counter 240 constituted of the 4 bit counter so as to determine the subsequent clock status of the semiconductor integrated circuit ⅛ frequency clock.

The clock status that shifts constantly as the next clock status is determined may undergo a change such as 0000->1000->0100->1100->0001->1001->0101->1101 ..., as shown in FIG. 12. Bit 0 of these four bits represents the frequency divided clock DIVCLK constituted of the semiconductor integrated circuit ⅛ frequency clock.

In addition, if the status undergoes a shift; 0001->1001->0101 as shown in FIG. 12, for instance, the switching valid signal CHG_GO becomes valid in the last status, i.e., the 0101 status, and once the switching valid signal CHG_GO is input from the AND circuit 234 to the status-determining circuit 236, no more shift occurs. Since the switching valid signal CHG_GO is valid, the next clock status returns to 0001 instead of shifting to 1101 and the 0001 status is sustained subsequently.

The clock status of the frequency divided clock DIVCLK must be held unchanged over a specific length of time while the switching valid signal CHG_GO remains valid, so as to allow stable clock switching to be carried out in a steady state in which both the frequency divided clock DIVCLK and the original clock ORGCLK are sustained at either high level or low level. Accordingly, by sustaining bit 0 at "1" level in the example described above, the frequency divided clock DIVCLK can be held in a constant state.

Thus, the semiconductor integrated circuit ⅛ frequency clock undergoes a status shift so as to ensure that bit 0 is sustained at "1" level (in the high-level state) over at least four clocks and at "0" level (in the low-level state) over at least four clocks, in order to hold the clock status of the frequency divided clock DIVCLK unchanged over the specific length of time while the switching valid signal CHG_GO remains valid, as shown in FIG. 12.

Bit 0 is sustained at "1" level and "0" level over at least four clocks each so as to ensure that the length of time over which bit 0 is sustained at each level extends longer than the clock width of the semiconductor integrated circuit ⅛ frequency clock that has been selected. By extending the length of time over which "1" level is sustained by at least, 1 cycle, for instance, the rated clock width selected for the semiconductor integrated circuit ⅛ frequency clock can be assured.

As a result, while the switching valid signal CHG_GO is valid, the value of DCNT0 at bit 0 constituting the value counted at the D counter 240 remains "1" at all times, and thus, the frequency divided clock DIVCLK sustains the "0" status indicating the value obtained by inverting the value of DCNT0 in this example, as shown in FIG. 7.

In addition, as long as the switching valid signal CHG_GO is valid and the frequency divided clock DIVCLK sustains the "0" status, the status of the original clock ORGCLK output by the OR circuit 202 simultaneously is also fixed at "0".

When the switching valid signal CHG_GO becomes invalidated, the timing with which the switch is to be made from the frequency divided clock DIVCLK will have been determined to be valid by the decision-making circuit 208, and thus, the clock cycle of the control basic clock BCLK is switched from the frequency divided clock DIVCLK to the original clock ORGCLK by the selector 204.

Next, the timing with which the control basic clock BCLK is switched from the semiconductor integrated circuit ⅛ frequency clock to the full frequency clock is explained in reference to FIG. 13. FIG. 13 is a timing chart of the operation during which a switch is made from the semiconductor integrated circuit ⅛ frequency clock to the full frequency clock.

The status shift of the frequency divided clock DIVCLK is counted at the D counter 240 by using the binary four bits. The D counter number of a counted value is indicated as a hexadecimal number.

The D counter number of the frequency divided clock DIVCLK is expressed as, for instance; F (2'b1111)->0 (2'b0000)->8 (2' b1000)->4 (2'b0100)->C (2'b1100)->1 (2'b0001), as shown in FIG. 13.

As shown in FIG. 13, the clock shifts at the status-determining circuit 236 with the semiconductor integrated circuit ⅛ frequency clock set for the frequency divided clock DIVCLK until a time point immediately before the D counter number shifts to "2" (No. 12). Likewise, the semiconductor integrated circuit ⅛ frequency clock is set for the control basic clock BCLK until immediately before the D counter number shifts to "6" (No. 12).

In addition, when the clock frequency division setting signal is set from "1" to "0" (from the semiconductor integrated circuit ⅛ frequency clock to the full frequency clock) as shown in FIG. 13, the clock switching signal CHGSTB is transmitted from the clock generation control circuit 6 to the frequency divided clock control circuit 4, as shown in FIG. 3, with the timing of the next cycle.

As the clock switching signal is transmitted to the frequency divided clock control circuit 4, the switching valid signal CHG_GO becomes valid at the D counter number "2" (No. 12) as shown in FIG. 13 and the switching valid signal CHG_GO is then transmitted from the AND circuit 234 to be provided to the status shift circuit 206 and the OR circuit 202.

As explained earlier, when the switching valid signal CHG_GO is input to the status shift circuit 206, the value of DCNT0 corresponding to bit 0 constituting the value counted at the D counter 240 remains at "0" at all times as long as the switching valid signal CHG_GO is valid. Thus, the frequency divided clock DIVCLK sustains the "1" status (the high-level state) indicating the value obtained by inverting the value of DCNT0 at all times.

Furthermore, as long as the switching valid signal CHG_GO is valid and the frequency divided clock DIVCLK sustains the "1" status, the status of the original clock ORGCLK output from the OR circuit 202 simultaneously, too, is fixed at "1" (the high-level state).

The subsequent D counter number following No. 13 at which the switching valid signal CHG_GO becomes valid is fixed at "2" as shown in FIG. 13. Thus, after the shift from the 0110 (D counter number: 6) status to the 0010 (D counter number: 2) status, no further status shift occurs as long as the switching valid signal CHG_GO remains valid, as shown in FIG. 12.

As shown in FIG. 13, since the subsequent D counter number is fixed at "2" (2'b0010) following No. 13, the value of DCNT0 corresponding to bit 0 constituting the value counted at the D counter 240 is sustained at "0". Namely, the frequency divided clock DIVCLK sustains the "1" status, i.e., the high-level state.

The original clock ORGCLK, too, sustains the "1" status, i.e., the high-level state. While these two clocks are in a stable state, as described above, the selector 204 switches from the frequency divided clock DIVCLK to the original clock ORGCLK as shown in FIG. 13. After the switch, the original clock ORGCLK is output as the control basic clock BCLK.

As shown in FIG. 13, the length of time required to switch from the frequency divided clock DIVCLK to the original clock ORGCLK in response to the setting change of the clock frequency division setting signal DSEL from "0" to "1" (from the semiconductor integrated circuit ⅛ frequency to the full frequency) is calculated to be: 8+2+5=15 . . . (3), through a conversion in which the master clock MCLK is used as a reference.

The value calculated in (3) above indicates that the length of time required for the switching processing is equivalent to 15 clocks.

The explanation has been given above on the shifts from the semiconductor integrated circuit ½ frequency clock, the semiconductor integrated circuit ¼ frequency clock and the semiconductor integrated circuit ⅛ frequency clock to the full frequency clock. The length of time required to switch from any of the semiconductor integrated circuit ½ frequency clock, the semiconductor integrated circuit ¼ frequency clock and the semiconductor integrated circuit ⅛ frequency clock to the full frequency clock is up to fifteen clocks in the related art.

In the first embodiment, a switch can be made from the semiconductor integrated circuit ½ frequency clock to the full frequency clock over 8 clocks, a switch can be made from the semiconductor integrated circuit ¼ frequency clock to the full frequency clock over 11 clocks and a switch can be made from the semiconductor integrated circuit ⅛ frequency clock to the full frequency clock over 15 clocks.

Thus, the length of switching time, which is up to 15 clocks in any switching processing in the related art, is reduced, and for this reason, even when an application program or the like needs to be processed at high speed, the switch from a low-speed clock (with a low frequency) to a high-speed clock (with a high frequency) can be made more quickly.

Figure 2:
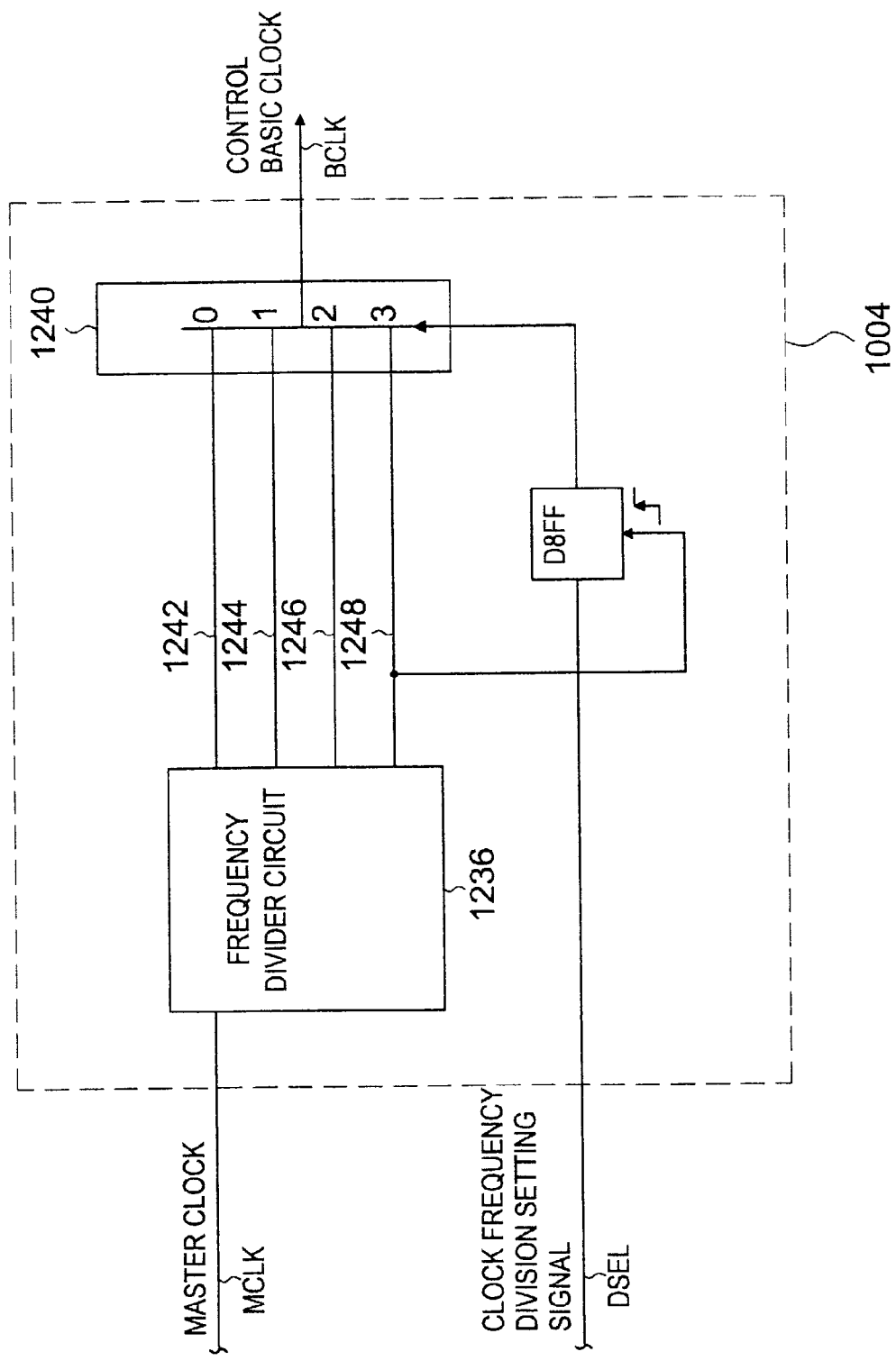
FIG. 2 presents at a block diagram showing the structure adopted in a status shift circuit in the related art.

In addition, while the selector 1240 in FIG. 2 selects one of the four different frequency divided clocks in the related art, the selector 204 in the first embodiment is only required to switch between two different frequency clocks, i.e., the frequency divided clock DIVCLK and the original clock ORGCLK as shown in FIG. 4. Consequently, the onus of the processing for adjusting the clock delay occurring between the original clock ORGCLK and the frequency divided clock DIVCLK is smaller, which, in turn, reduces the risk of a hazard.

(Second Embodiment)

Figure 14:
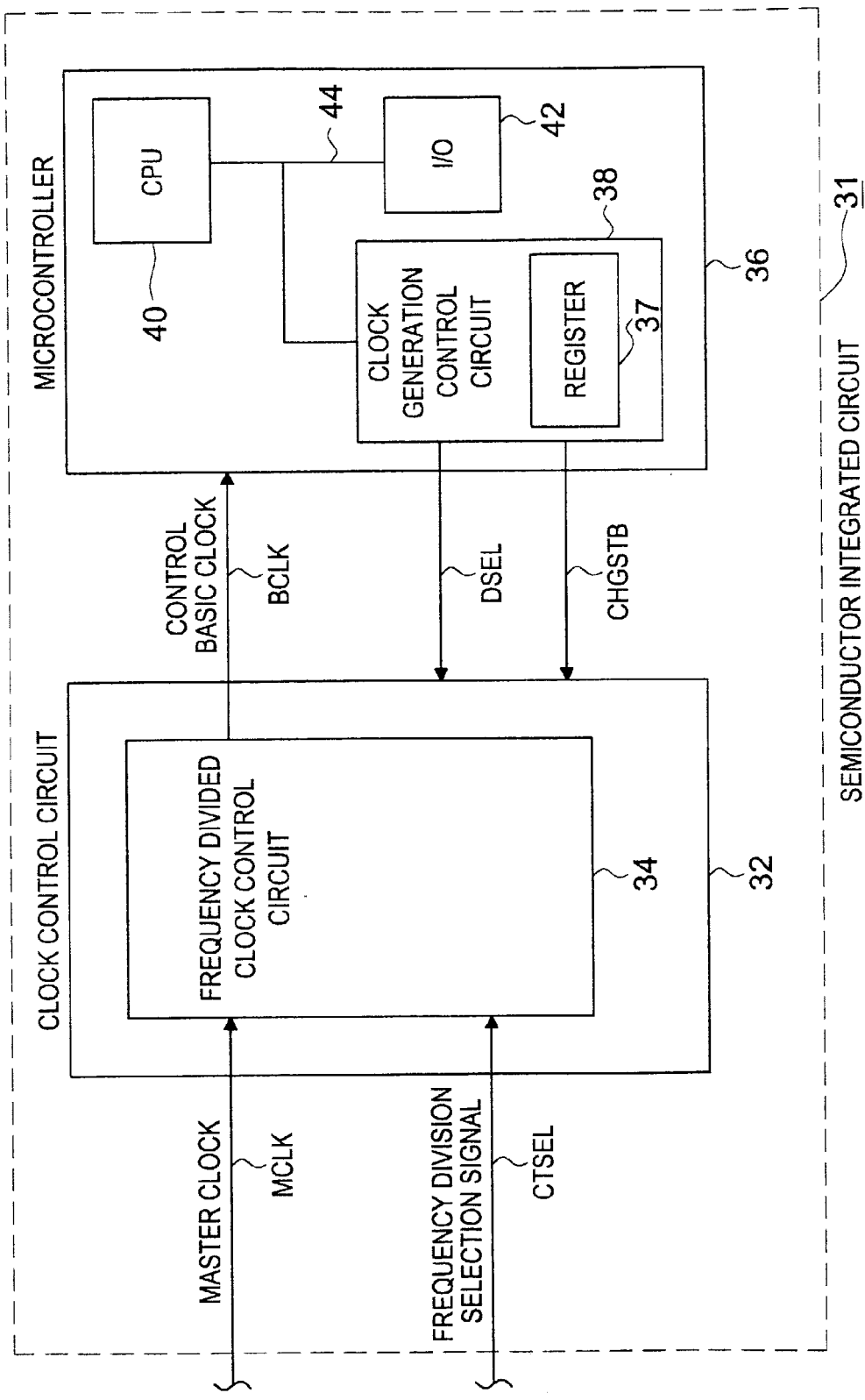
FIG. 14 presents a block diagram showing the structure adopted in the semiconductor integrated circuit in a second embodiment.

Next, the second embodiment achieved by further improving the first embodiment is explained in reference to FIG. 14. FIG. 14 presents a block diagram of a semiconductor integrated circuit 31 achieved in the second embodiment.

As illustrated in FIG. 14, the semiconductor integrated circuit 31 is achieved by further improving the semiconductor integrated circuit 1 in the first embodiment. Accordingly, an explanation is given by focusing on the differences between the semiconductor integrated circuit 1 in the first embodiment and the semiconductor integrated circuit 31 in the second embodiment.

The semiconductor integrated circuit 31 comprises a microcontroller 36 and a clock control circuit 32. In addition, a frequency division selection signal CTSEL having the cycle of the frequency divided clock on the switching source side set therein is input as an input terminal signal to the semiconductor integrated circuit 31 from the outside in the second embodiment.

In the second embodiment, the frequency division selection signal CTSEL is used to select either a mode in which a switch is made from the slowest clock, i.e., from the semiconductor integrated circuit ⅛ frequency clock, on the switching source side or a high-speed mode in which a switch is made from the semiconductor integrated circuit ½ frequency clock or the semiconductor integrated circuit ¼ frequency clock as explained in reference to the first embodiment. In the second embodiment, when the level of the frequency division selection signal CTSEL is at "1", the mode in which a switch from the slowest clock (the semiconductor integrated circuit ⅛ frequency clock) is made, is selected.

A frequency divided clock control circuit 34 constituting the clock control circuit 32 is a circuit that implements frequency divided clock control by making a decision as to whether the high-speed mode or the slowest mode has been selected based upon the value indicated by the frequency division selection signal CTSEL.

Figure 15:
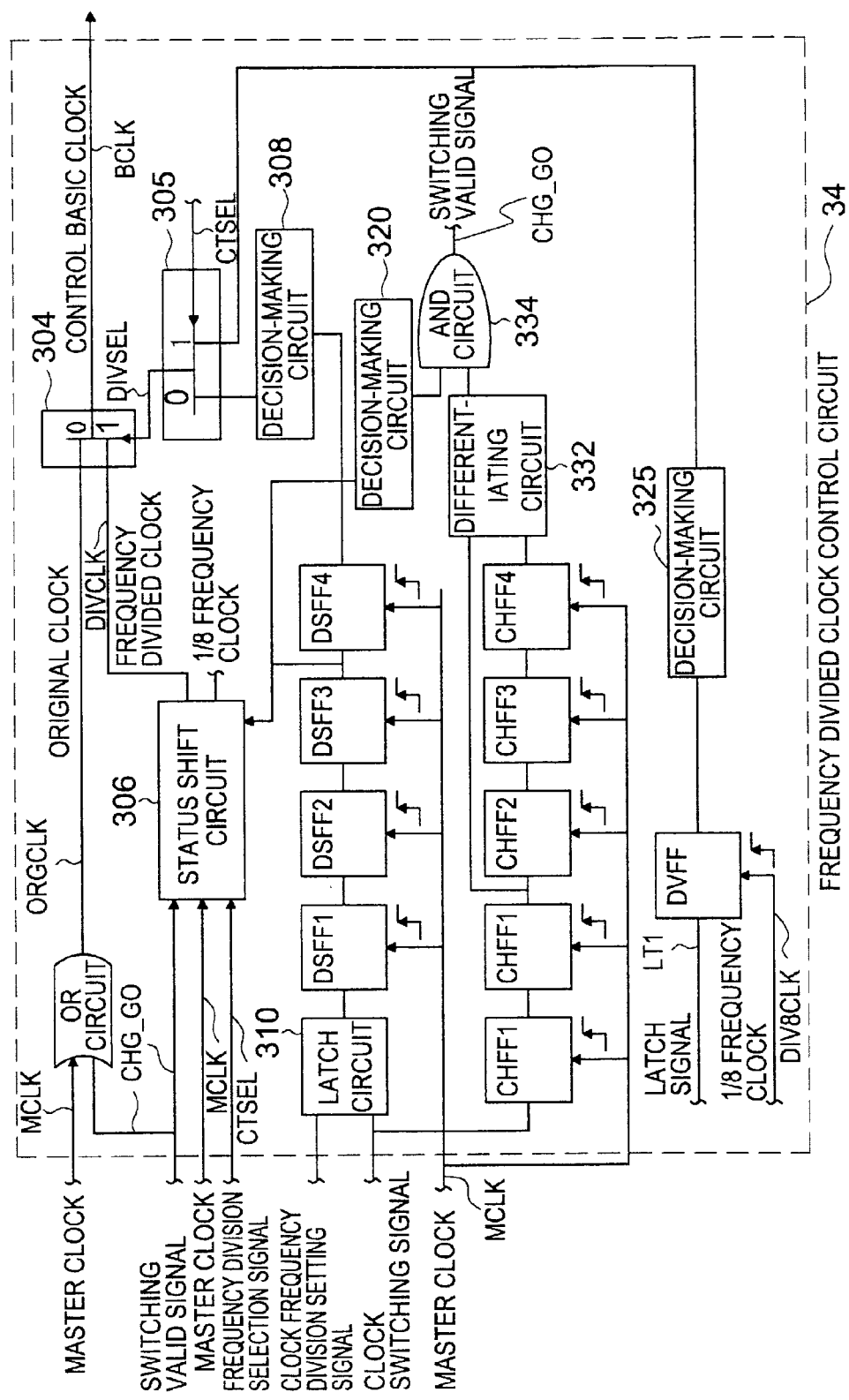
FIG. 15 presents at a block diagram showing the structure adopted in the frequency divided clock control circuit in the second embodiment.

Next, the frequency divided clock control circuit 34 achieved in the second embodiment is explained in reference to FIG. 15. FIG. 15 presents a block diagram of the frequency divided clock control circuit achieved in the second embodiment.

Upon receiving the frequency division selection signal CTSEL input thereto, a status shift circuit 306 generates a ½ frequency clock, a ¼ frequency clock or a ⅛ frequency clock.

The semiconductor integrated circuit ⅛ frequency clock DIV8CLK, with a slow cycle, is used as an input clock for a flip-flop DVFF and holds the value indicated by the clock frequency division setting signal DSEL.

A decision-making circuit 325 decides that the value at the flip-flop DVFF is "1" if either of the two bits is not set to 00 (2'b00), whereas it decides that the value is "0" if both bits are set to 00 (2'b00).

A frequency division decision-making signal DIVSEL is output from a selector 305. The selector 305 selects either the signal output by a decision-making circuit 308 or the signal output by the decision-making circuit 325 in conformance to the value indicated by the frequency division selection signal CTSEL.

A selector 304 selects either the original clock ORGCLK or the frequency divided clock DIVCLK based upon the value indicated by the frequency division decision-making signal DIVSEL. The selected clock is then output as the control basic clock BCLK.

Figure 16:
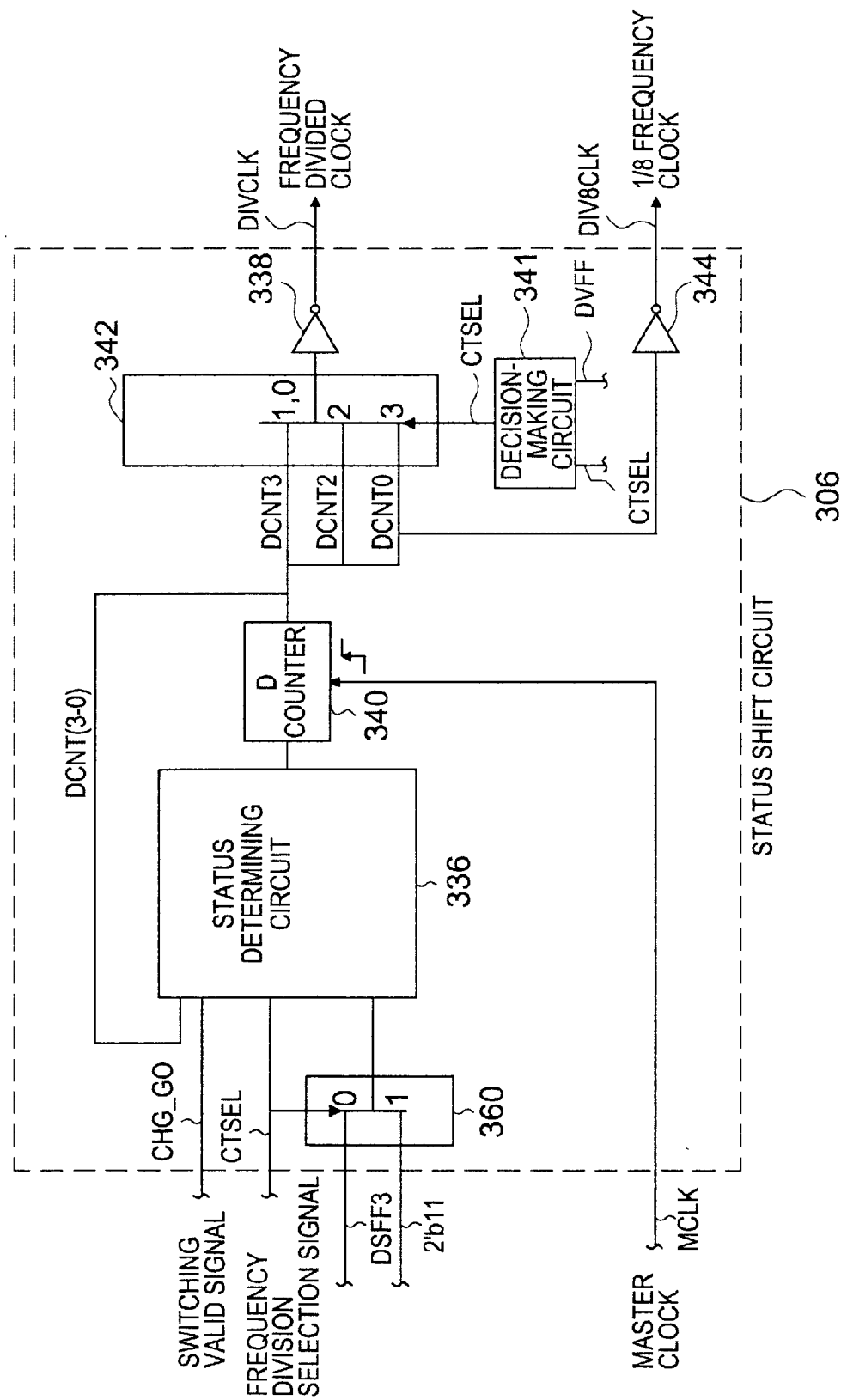
FIG. 16 presents a block diagram showing the structure adopted in the status shift circuit in the second embodiment.

Next, in reference to FIG. 16, the status shift circuit 306 achieved in the second embodiment is explained. FIG. 16 presents a block diagram of the status shift circuit 306 achieved in the second embodiment.

As shown in FIG. 16, the status shift circuit 306 is constituted of a status determining circuit 336, an invertor 338, a D counter 340, a decision-making circuit 341, a selector 342 that outputs the frequency divided clock DIVCLK, an invertor 344 and a selector 360.

When the value of the frequency division selection signal CTSEL indicates "1" (the slowest mode), the selector 360 selects "11" (2'b11), whereas if the value of the frequency division selection signal CTSEL is "0" (the high-speed mode), the selector 360 selects the setting signal flip-flop DSFF3.

The 4-bit count value at the D counter 340 includes the value of DCNT0 (bit 0) for generating the semiconductor integrated circuit ⅛ frequency clock, the value of DCNT2 (bit 2) for generating the ¼ frequency clock and finally, the value of DCNT3 (bit 3) for generating the semiconductor integrated circuit ½ frequency clock.

The selector 342 selects the value at the flip-flop DVFF if the frequency division selection signal CTSEL indicates "1" and selects the value of DCNT0 if the frequency division selection signal CTSEL indicates "0", based upon the results of the decision made at the decision-making circuit 341.

Next, the operation of the status shift circuit 306 performed in the second embodiment is briefly explained in reference to FIG. 16.

When the frequency division selection signal CTSEL indicates the value "1" (the slowest mode), the selector 360 selects the input value "11" (2'b11). Consequently, the operation enters a state in which the semiconductor integrated circuit ⅛ frequency clock is selected at all times, and the status determining circuit 336 generates the semiconductor integrated circuit ⅛ frequency clock accordingly.

If the value of the frequency division selection signal CTSEL is "1", the switching valid signal CHG_GO is negated and thus, is not allowed to become validated. As a result, the operation is executed on the semiconductor integrated circuit ⅛ frequency clock at all times without sustaining a state in which the clock remains either at high level or at low level.

As shown in FIG. 12, DCNT3 corresponding to bit 3 of the D counter indicates an operation executed on the semiconductor integrated circuit ½ frequency clock at all times, DCNT2 corresponding to bit 2 indicates an operation performed on the semiconductor integrated circuit ¼ frequency clock and DCNT0 corresponding to bit 0 indicates an operation performed on the semiconductor integrated circuit ⅛ frequency clock.

One of the frequency divided clocks is selected by the selector 342 based upon the value indicated by the frequency division selection signal CTSEL and is output as the frequency divided clock DIVCLK. In addition, DCNT0 corresponding to bit 3 of the D counter is also utilized to generate the semiconductor integrated circuit ⅛ frequency clock DIV8CLK to function as a sampling clock at the flip-flop DVFF.

Furthermore, DCNT1 at bit 1 of the D counter corresponds to a 1/16 frequency clock, and the present invention may be implemented in conjunction with a 1/16 frequency clock by providing a specific circuit that is required in the semiconductor integrated circuit 31.

There is a risk of breakdown of the clock duty during a clock switching operation in the first embodiment, and when the stability of the duty is a crucial requirement for the user of the semiconductor integrated circuit, the semiconductor integrated circuit ⅛ frequency clock can be preselected with the frequency division selection signal CTSEL by adding the flip-flop DVFF, the selector 305, the selector 360, the selector 342 and the frequency division selection signal CTSEL constituting an external terminal in the semiconductor integrated circuit 1 achieved in the first embodiment.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

While an explanation is given above in reference to the embodiments on an example in which the frequency divided clock is set to the full frequency, the semiconductor integrated circuit ½ frequency, the semiconductor integrated circuit ¼ frequency or the semiconductor integrated circuit ⅛ frequency, the present invention is not limited to this example. For instance, the present invention may be adopted in conjunction with a 1/32 frequency clock or the like, as well.

In addition, while an explanation is given above in reference to the embodiments on an example in which the clock switching signal CHGSTB is transmitted during the cycle following the setting of the clock frequency division setting signal DSEL, the present invention is not restricted by such details, and the clock switching signal CHGSTB may be transmitted prior to the subsequent cycle following the setting of the clock frequency division setting signal DSEL.

Furthermore, while an explanation is given above in reference to the embodiments on an example in which the clock switching signal CHGSTB is constituted of a clock switching strobe (strobe signal), the present invention is not limited to this example, and since the clock switching signal CHGSTB does not need to be provided as long as the circuit design of the semiconductor integrated circuit 1 ensures that the setup/hold inside the clock control circuit can be completed within a single cycle of the master clock MCLK, even faster switching can be realized.

According to the present invention, since a quick switch to a high frequency can be made in response to a high-speed operation request issued during a low-frequency operation to promptly execute the processing operation in a semiconductor integrated circuit, the frequency can be kept as low as possible during a normal operation until a high-speed operation request is issued, as explained above.

What is claimed is:

1. A semiconductor integrated circuit comprising:
   a clock control circuit having a reference clock input thereto, which generates a control basic clock to be used to implement clock control on a central processing unit; and
   a microcontroller that includes said central processing unit and a clock generation control circuit that controls the generation of said control basic clock at said clock control circuit in conformance to an instruction issued by said central processing unit, wherein:
   said clock control circuit includes:
   a status shift circuit that generates a frequency divided clock by shifting the status of a signal level in correspondence to a value indicated by a clock frequency division setting signal transmitted from said clock generation control circuit;
   a switching timing generation circuit that measures the timing with which a switch between said reference clock and said frequency divided clock is made; and
   a selection switching circuit that generates said control basic clock by switching between said reference clock and said frequency divided clock,
   wherein said status shift circuit individually generates frequency divided clocks with varying cycles.

2. A semiconductor integrated circuit according to claim 1, wherein:
   said status shift circuit holds the signal level of said frequency divided clock in a constant state with the timing with which a switching valid signal generated by the switching timing generation circuit is received.

3. A semiconductor integrated circuit according to claim 2, wherein:
   said switch is made while at least the signal level of said frequency divided clock is sustained in a steady state.

4. A semiconductor integrated circuit according to claim 1, wherein:
   said frequency divided clock to be generated is preselected.

5. A semiconductor integrated circuit comprising:
   a clock control circuit having a reference clock input thereto, which generates a control basic clock to be used to implement clock control on a central processing unit; and
   a microcontroller that includes said central processing unit and a clock generation control circuit that controls the generation of said control basic clock at said clock control circuit in conformance to an instruction issued by said central processing unit, wherein:
   said clock control circuit includes:
   a status shift circuit that generates a frequency divided clock by shifting the status of a signal level in correspondence to a value indicated by a clock frequency division setting signal transmitted from said clock generation control circuit;

a switching timing generation circuit that measures the timing with which a switch between said reference clock and said frequency divided clock is made; and a selection switching circuit that generates said control basic clock by switching between said reference clock and said frequency divided clock while both said reference clock and said frequency divided clock are at high level.

6. A semiconductor integrated circuit according to claim 5, wherein:

said status shift circuit individually generates frequency divided clocks with varying cycles.

7. A semiconductor integrated circuit according to claim 5, wherein:

said status shift circuit holds the signal level of said frequency divided clock in a high-level state with the timing with which a switching valid signal generated by the switching timing generation circuit is received.

8. A semiconductor integrated circuit according to claim 5, wherein:

said status shift circuit includes a D counter that controls the signal level of an output clock and;

a status determining circuit that determines the status of the signal level of a next output clock.

9. A semiconductor integrated circuit according to claim 5, wherein:

said clock generation control circuit includes a register capable of a data write and a data read and transmits a clock switching signal indicating that a write operation has been performed at said register to said clock control circuit.

10. A semiconductor integrated circuit according to claim 9, wherein:

said clock generation control circuit transmits said clock switching signal to said clock control circuit after transmitting said clock frequency division setting signal to said clock control circuit.

11. A semiconductor integrated circuit according to claim 5, wherein:

said switching timing generation circuit transmits a switching valid signal to said status shift circuit with the timing with which said clock switching signal is received.

12. A semiconductor integrated circuit according to claim 5, wherein:

said frequency divided clock is constituted of a full frequency clock, a ½ frequency clock, a ¼ frequency clock or a ⅛ frequency clock.

13. A semiconductor integrated circuit according to claim 5, wherein:

said clock control circuit receives a frequency division selection signal in which a frequency divided clock selected at a switching source side is set.

14. A semiconductor integrated circuit according to claim 13, wherein:

a ⅛ frequency clock, a ¼ frequency clock or a ½ frequency clock is selected for said frequency divided clock at said switching source side.

15. A semiconductor integrated circuit according to claim 14, wherein:

said frequency division selection signal is used to switch from a ⅛ frequency clock to another frequency divided clock.

* * * * *